United States Patent [19]

Roth et al.

[11] Patent Number: 4,898,632
[45] Date of Patent: Feb. 6, 1990

[54] METHOD OF MANUFACTURING A SAFETY GLASS PANE COMPRISED OF A SHEET OF GLASS AND A SHEET OF FLEXIBLE PLASTIC MATERIAL

[75] Inventors: Mario Roth; Vordem Esche, both of Aachen; Heinz Scholl, Eschweiler, all of Fed. Rep. of Germany

[73] Assignee: Saint-Gobain Vitrage, Courbevoie, France

[21] Appl. No.: 635,526

[22] Filed: Jul. 30, 1984

[30] Foreign Application Priority Data

Jul. 28, 1983 [FR] France ................................ 83 12460

[51] Int. Cl.⁴ .............................................. B32B 17/00
[52] U.S. Cl. ....................................... 156/99; 156/102; 156/103; 156/104; 156/288; 156/289; 156/323
[58] Field of Search ............... 156/102, 288, 103, 289, 156/104, 323, 99

[56] References Cited

U.S. PATENT DOCUMENTS

| 1,887,565 | 11/1932 | Sherts | 156/104 |
| 2,499,959 | 3/1950 | Kruse et al. | 144/256.3 |
| 3,449,184 | 6/1969 | Balk | 156/105 |
| 3,453,161 | 7/1969 | Golightly | 156/102 |
| 3,806,387 | 4/1974 | Peetz et al. | 156/102 |

FOREIGN PATENT DOCUMENTS

| 800669 | 8/1958 | United Kingdom | 156/104 |
| 1047020 | 11/1966 | United Kingdom | 156/288 |

Primary Examiner—John J. Gallagher
Attorney, Agent, or Firm—Oblon, Spivak, McClelland, Maier & Neustadt

[57] ABSTRACT

The invention relates to the manufacture of laminated safety glass panes comprised of a sheet of glass and a sheet of flexible plastic material. Within the framework of a method wherein a "counter-mold" is applied to the plastic sheet or film before permanent combination of the constituent parts of the product glass pane, the invention proposes an improvement wherein, before this final assembly, stacks corresponding to a plurality of product glass panes are superimposed, wherewith the face of each of the glass sheets which face is not covered by its corresponding plastic sheet or film serves as the "counter-mold" for the adjoining stack.

10 Claims, No Drawings

METHOD OF MANUFACTURING A SAFETY GLASS PANE COMPRISED OF A SHEET OF GLASS AND A SHEET OF FLEXIBLE PLASTIC MATERIAL

BACKGROUND OF THE INVENTION

1. Field of the Invention

The invention relates to the manufacture of laminated safety glass panes comprised of a sheet of glass and a sheet of flexible plastic material which latter sheet is comprised of at least one layer.

2. Description of the Prior Art

In particular, the plastic sheet comprises a single or multilayered sheet, which may be comprised, e.g., of a layer of transparent plastic material having energy-absorbent properties. Said sheet may also be comprised of a facing layer of a plastic material which resists scratching and abrasion.

The subject glass panes must satisfy a number of requirements. In order to find use, particularly in the automobile industry, e.g., as windshields, they must have excellent optical properties in addition to excellent biomechanical properties. (Biomechanical properties are those properties related to human safety considerations, such as, for example in the automobile industry, considerations relating to passenger impact upon a glass pane as the result of an automobile accident.) One of the problems encountered in the manufacture of this type of glass pane is that of the flawless application of the sheet of plastic material to the glass sheet such that the initial optical properties of said plastic sheet are preserved.

It is particularly difficult to achieve such an application operation wherein, in the course of manufacturing curved laminated glass panes, one needs to avoid wrinkling to the plastic sheet.

A number of methods of manufacturing the subject type of glass pane are known.

Generally, according to the known methods, the procedure is as follows: The different sheets which are to make up the laminated glass pane are stacked and are combined with the aid of heat and pressure, wherewith the combining operation is generally preceded by a preliminary combining operation wherein the air trapped between the sheets is evacuated.

Fr. Pat. 2,153,037, for example, discloses a method called "contre-moule" (in English, "counter-molding"), employed particularly for manufacturing laminated safety glass panes comprised of a silicate glass sheet and a flexible plastic sheet, whereby the constituent parts of the glass pane are combined with the aid of heat, possibly also under pressure, and whereby prior to any pressing or heating a protective glass sheet is applied to the stacked plastic sheet which protective glass sheet is of a shape corresponding to the shape of the glass sheet which is a constituent of the laminated glass pane being produced, and which protective glass sheet will be removed after the thermal treatment (which treatment may also be accompanied by independent pressing). The presence of the protective glass sheet (called the "counter-mold") enables one to avoid the development of defects in planarity or, in general, the development of warping during the heat and pressure treatment.

According to a variant of this "counter-molding" method of manufacture, which variant is described in particular in Fr. Pat. 2,123,089 for the manufacture of a sheet of silicate glass covered with a flexible plastic sheet with an intermediate layer of a thermo-plastic adhesive, the protective counter-mold sheet is applied during a preliminary combination operation wherein the air trapped between the constituent parts of the glass pane being produced is evacuated. This type of preliminary operation by itself leads to sufficient adhesion between the sheets to render the product pane suitable for certain applications. However, for the product to be used as a windshield, this operation must be followed by a final combination operation. The preliminary combination facilitates the final combination.

This known method of manufacturing a laminated glass pane, employing a "counter-mold", has certain advantages but at the same time is relatively costly, since a separate counter-sheet (i.e., "counter-mold piece") must be used for each laminated pane produced; moreover, in general, and particularly in the case of curved glass panes, each counter-sheet is used only once, being discarded after it is removed from the product pane, and there is the strict requirement that the curvature of the "counter-mold" be identical to that of the glass sheet which is a constituent of the laminated glass pane product.

SUMMARY OF THE INVENTION

The object of the present invention is to improve the known "counter-molding" method, particularly by improving the economy thereof.

This object is achieved according to the invention by a method wherein a plurality of stacks are superimposed, each of which is destined to comprise a product glass pane and is comprised of a glass sheet and a flexible plastic sheet which plastic sheet is comprised of at least one layer, whereby the face of each such glass sheet which is not covered by its corresponding plastic sheet serves as a "counter-mold" for the adjoining stack, wherewith the final such stack is covered by a final "counter-mold", and separating means are inserted between the stacks, and wherein the superimposed arrangement is subjected to elevated temperature and pressure capable of permanently binding together the constituent parts of each product glass pane.

DESCRIPTION OF THE PREFERRED EMBODIMENTS

Thus, the inventive method enables one to simultaneously produce a series of glass panes while employing only a single "counter-mold" sheet of the customary type, e.g., a sheet of silicate glass. In this manner one may permanently bind together the respective sets of layers corresponding to a plurality of laminated glass panes, such that the optical properties of the panes are maintained. Further, by employing a single operation to manufacture a plurality of laminated glass panes, one saves time, and also saves materials, since it is only the glass sheet serving as the "counter-mold" for the final stack and being placed on the external face of the structure which (said glass sheet) is at risk of becoming unusable. After the thermal treatment has been carried out and the said glass sheet serving as the conventional "counter-mold" has been removed, all the other glass sheets in the structure comprise parts of respective laminated glass panes.

According to the known "counter-molding" method, it is generally desirable to carry out a preliminary combination of the constituent parts of the product glass pane, to produce provisional adhesion between said parts. The invention may be employed also in this stage of the process.

The preliminary combination of the constituent parts serves to remove the air trapped between the layers. Various means are known to achieve this. For example, Eur. Pat. No. 15209 discloses a process called "calendering" wherein the constituent parts of the product glass pane are passed in a stack through two calender rolls.

The inventive method may be applied to preliminarily combined sets of constituent parts corresponding to individual product glass panes, which preliminarily combined sets have been separately produced by the said calendering process. Separating means are inserted, following which these sets are superimposed, a final "counter-mold" is applied, and the individual product glass panes are each permanently assembled (i.e., bonded) by thermal treatment under pressure.

According to another embodiment of the invention, a single preliminary combination is produced by calendering at ambient temperature after having stacked together the sets of sheets corresponding to a plurality of product glass panes, then the final (terminal) "counter-mold" is applied, and the resulting structure is subjected to an autoclaving cycle.

Alternatively to the manufacturing of the preliminary combinations by calendaring, it is also known to degas the sets of sheets under vacuum. A number of procedures are possible. For example, one may merely apply a vacuum after stacking together the sheets which are to make up the product glass pane. Another possibility is to place the stack in a flexible bag, and place the bag in a chamber where an vacuum is produced. Then the bag is sealed. Said chamber advantageously may be an autoclave, where subsequently one may directly carry out the permanent assembly (i.e., bonding) of the product glass pane according to the bonding method of Fr. Pat. No. 2,123,089.

According to one embodiment of the invention, a single preliminary combination corresponding to a plurality of product glass panes may be produced by applying a vacuum after having applied the final (terminal) "counter-mold", and this combination may then be subjected directly to an autoclaving cycle.

Also, a single aggregate preliminary combination may be produced employing a bag.

According to one feature of the invention, the treatment at elevated temperature and pressure aimed at permanent bonding of the constituent parts of the product glass pane is carried out in an autoclave at 100° to 140° C. and 6 to 10 bar, the values within these ranges depending on the properties of the sheets of plastic material.

The separating means required to prevent adhesion between the laminated glass panes may be in the form of a coating, film, or sheet of an appropriate release agent. Preferably, thin sheets of polypropylene are employed.

The inventive method is particularly applicable to the manufacture of laminated safety glass panes such as are described in Ger. OS 22 20 753. The pane according to this OS is a laminated pane comprised of a sheet of silicate glass, an intercalated sheet of flexible polyvinyl butyral, and a flexible protective layer comprised of a highly elastic, three-dimensionally crosslinked polyurethane. The inventive method is also applicable to glass panes such as are described in Eur. Pat. App. No. 0 054 491, wherein the intercalated sheet is based on a thermoplastic polyurethane-polyurea. In these two types of glass pane, the flexible protective sheet is self-healing, i.e., surface impressions in it disappear spontaneously in a short time.

Other features of the invention will become apparent in the course of the following descriptions of exemplary embodiments which are given for illustration of the invention and are not intended to be limiting thereof.

EXAMPLE 1

This example illustrates the manufacture of a laminated glass pane for use as an automobile windshield, said pane comprising a glass sheet covered by a plastic sheet comprised of a polyurethane-polyurea material which sheet has energy-absorbing properties.

Six glass sheets such as are obtained by the float process, having thickness 3 mm, are stacked and subjected to a curving process to yield a shape suitable for automobile windshields, the process being, e.g., that described in U.S. Pat. No. 3,453,161. Then they are slowly cooled to ambient temperature. Five of these curved glass sheets will be employed as constituent parts of product laminated glass panes, while the sixth will be employed as the "counter-mold" in the method according to the invention.

A transparent film 0.5 mm thick of a thermoplastic polyurethane-polyurea, e.g., that material described in Eur. Pat. No. 0054 491, is applied to the concave faces of five of the curved glass sheets. The application is accomplished by calendaring as described in Eur. Pat. No. 15 209, at ambient temperature, such that a preliminary combination is obtained comprised of the plastic film and the glass sheet. Then separating means in the form of a sheet of polypropylene are applied. Next, the convex face of the glass sheet which was immediately adjacent the first glass sheet at the time of the curving process is placed against the polypropylene sheet. The concave face of this second glass sheet has also been covered with a film of polyurethane-polyurea as with the first glass sheet. In this manner the five glass sheets covered with respective polyurethane-polyurea films and separated by respective polypropylene sheets are stacked. The sixth glass sheet, which also was curved in the same curving process and batch, is employed as a "counter-mold", applied as the final sheet in the stack and, as such, not covered with a polyurethane-polyurea film.

The stack thus obtained, comprised of the layers as described, is introduced into an autoclave in which conditions of 140° C. and 8 bar are established and maintained for about 2 hr. After the pressure and temperature are lowered, the stack is removed from the autoclave, the "counter-mold" is removed, and the five glass sheets covered by respective polyurethane-polyurea films are separated.

Then a supplementary film 0.3 mm thick comprised essentially of a three-dimensionally crosslinked, highly elastic polyurethane material is applied to each of these two-layered laminated glass panes, wherewith for each such pane a prelinary combination with said supplementary film is produced by calendering at ambient temperature. The composition of this supplementary film, which serves as a self-healing coating for the glass pane, is described, e.g., in Ger. AS 26 29 779. Then a polypropylene sheet is applied, as a separation means, to the film of highly elastic polyurethane, and the five preliminarily combined three-layer laminated glass panes are superimposed (stacked), mutually separated by respective polypropylene sheets. The stack is terminated (or covered) by the same sixth glass sheet which served previously as a "counter-mold", and the entire aggregate is introduced into an autoclave in which conditions of 100° C. and 8 bar are established. This produces permanent bonding between the thermoplastic polyurethane-polyurea film and the supplementary highly elastic polyurethane film. After the pressure and temperature are lowered, the stack is removed from the autoclave, the "counter-mold" is removed, and the laminated glass panes are separated.

EXAMPLE 2

Curving and quenching are carried out on a series of glass sheets obtained by the float process, having a thickness of 4 mm, by means of a quenching and curving apparatus such as is described, e.g., in Eur. Pat. No. EP 0003 391. The glass sheets are curved into a shape which satisfies necessary criteria applied to automobile windshields. Six such curved glass sheets are chosen having substantially identical curvature, to serve as stock and "counter-mold" for manufacturing laminated glass sheets according to the invention.

In this Example, a two-layer plastic sheet such as described in Fr. Pat. 2,398,606 is applied to the concave face of the five glass sheets. One of the layers of said plastic sheet is comprised of a thermo-plastic polyurethane material having adhesive properties, which layer is manufactured by coating the material onto a support. The other layer is comprised of a three-dimensional crosslinked, highly elastic polyurethane material, which layer is also manufactured by coating the material onto a support. The two-layer plastic sheet is lightly pressed to fix it preliminarily to the glass sheet. Then a polypropylene separating sheet is applied to the two-layer plastic sheet, and over this there is placed a second preliminary combination comprised of a glass sheet and two-layered sheet of plastic material, said second combination being prepared in the same manner as the first. Continuing thusly, five preliminary combinations are superimposed (stacked), with a polypropylene sheet being inserted between each successive pair. The sixth glass sheet is then applied, to serve as the "counter-mold".

This aggregate (stack) of superposed preliminary combinations is introduced into a vessel which can be evacuated, and a vacuum is applied to said vessel, in such a way as to evacuate air which may be trapped between the layers in the stack. There results a single preliminary aggregate. While maintaining the vacuum within the vessel, the stack is included in a bag comprised of an airtight film, and said bag is sealed by a fusion-type procedure, e.g., the procedure described in Ger. AS 20 24 781.

Then the stack of superposed preliminary combinations, surrounded by its airtight packaging, is introduced into an autoclave wherein conditions of 130° C. and 10 bar are established and maintained, resulting in permanent bonding between each glass sheet (of the five abovementioned combinations) and its associated two-layered plastic sheet which are to comprise the respective laminated glass panes. After the pressure and temperature are lowered, the stack is removed from the autoclave, the "counter-mold" is removed, and the five laminated glass pane products are separated.

EXAMPLE 3

The procedure is as described in Example 2, but one employs a sheet of annealed glass 2.6 mm thick to which a two-layer sheet of plastic is applied, which two-layer plastic sheet is obtained as follows: The first layer formed, which for example is the layer of self-healing plastic material, is a film of heat-setting polyurethane 0.3 mm thick formed by molding (by flow-molding) a homogeneous mixture on a continuously moving glass support, which film is coated by a separation agent which may be, e.g., that described in Fr. Pat. 2,383,000, namely a modified ethylene dioxide addition product. This mixture comprises the reactants for forming the polyurethane has the following composition:

1000 g of a polyether of molecular weight of about 450, obtained by condensing 1,2-epoxypropane with 2,2-bis(hydromethyl)-1-butanol and having 10.5 to 12% by wt. of free hydroxyl groups, said polyether formulation further containing 1% by wt. of a stabilizer, 0.05 wt. % of a catalyst, namely dibutyltin dilaurate, and 0.1 wt. % of a dispersion agent; and 1020 g of a biuret from 1,6-hexanediisocyanate, said biuret having about 23.2% of free isocyanate groups.

A molding head (or tap head) of the type described in Fr. Patent 2,347,170 is employed. A uniform layer is applied which, after polymerization under the action of heat (e.g. 120° C., 15 min) has a thickness of about 0.19 mm and is self-healing.

To produce the second layer, which is the layer having energy-absorbent properties, the polyol component is prepared in advance. This component is prepared by mixing a polymer of 1,4-butanediol having molecular weight 1000 (e.g. the product Polymeg 1000 ® supplied by the Quaker Oats Co.) with 1,4-butanediol itself, with the two constituents being in a proportion such that 37 mole-equivalent % of the hydroxyl groups are in the polymer of 1,4-butanediol and 63 mole-equivalent % are in the 1,4-butanediol.

A stabilizer is incorporated in the polyol component in the amount of 0.5 wt. % of the total weight of the polyol component and the isocyanate component; a surfactant is incorporated in the amount of 0.05 wt. % of the same total basis, and a catalyst, namely dibutyltin dilaurate, is incorporated in the amount of 0.02 wt. % of said basis.

The isocyanate component employed comprises 3-isocyanatomethyl-3,5,5-trimethylcyclohexylisocyanate having urea groups obtained by partial hydrolysis of the IPDI and having a content of free NCO groups of about 31.5 wt. %.

The components are taken in quantities such that the mole-equivalent ratio of free NCO to free OH groups is 1.

After degassing of the components under vacuum, the mixture, having been brought to 40° C., is flow-molded with the aid of a molding head such as described in Fr. Pat. 2,347,170, on top of the self-healing polyurethane layer previously formed. In this way, a second layer 0.53 mm is formed which is then subjected to a polymerization cycle consisting of heating to about 120° C. for 25 min.

The two-layer plastic sheet is removed from the glass support. It is easy to handle, and may be stored or immediately used in the manufacture of the laminated glass panes.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method of manufacturing a laminated glass pane comprised of the following constituent parts: (i) a sheet of glass and, (ii) a sheet or film of flexible plastic material, wherein said sheet or film comprises at least one layer of flexible plastic material, said method comprising:

(i) stacking the constituent parts of at least two curved panes such that a face of each glass sheet which face is not covered by its corresponding plastic sheet or film serves as a counter-mold for the adjoining pane, and whereby a separating means is inserted between each pane;

(ii) applying a final counter-mold over the exposed plastic sheet of said stack;

(iii) subjecting the stacked panes and counter mold to conditions of elevated temperature and pressure.

2. The method of claim 1, wherein said elevated temperature and pressure are capable of promoting the permanent binding together of the constituent parts of each glass pane.

3. The method of claim 2 wherein said elevated temperature and pressure are in the ranges of 100° C. to 140° C. and 6 bar to 10 bar respectively.

4. The method of claim 1 wherein the separating means comprises a polypropylene sheet.

5. The method of claim 1 wherein the constituent parts of at least one of said panes are combined separately by passing said constituent parts of the pane between a pair of calendering rolls.

6. The method of claim 1 wherein a single preliminary aggregate combination corresponding to a plurality of said glass panes is manufactured by calendering at ambient temperature.

7. The method of claim 1 wherein the constituent elements of a plurality of said laminated glass panes are stacked, a final counter-mold is applied to said stack, and a single preliminary aggregate combination is produced from this stack with the aid of a vessel in which a vacuum is established and said preliminary aggregate combination is then subjected to conditions of elevated temperature and pressure.

8. The method of claim 7 wherein before subjecting the single preliminary aggregate combination to elevated temperature and pressure, the single preliminary aggregate combination is introduced into an enclosing packaging means connected to a vacuum pump, the packaging means is sealed and the packaging means containing said single preliminary aggregate combination is inserted in a chamber to which a vacuum is applied.

9. The method of claim 1 wherein said sheets of glass comprise tempered glass.

10. The method of claim 1 wherein said final counter-mold comprises a glass sheet which is fabricated by the same process as the glass sheets which are the constituent parts of the laminated glass panes.

* * * * *